UNITED STATES PATENT OFFICE.

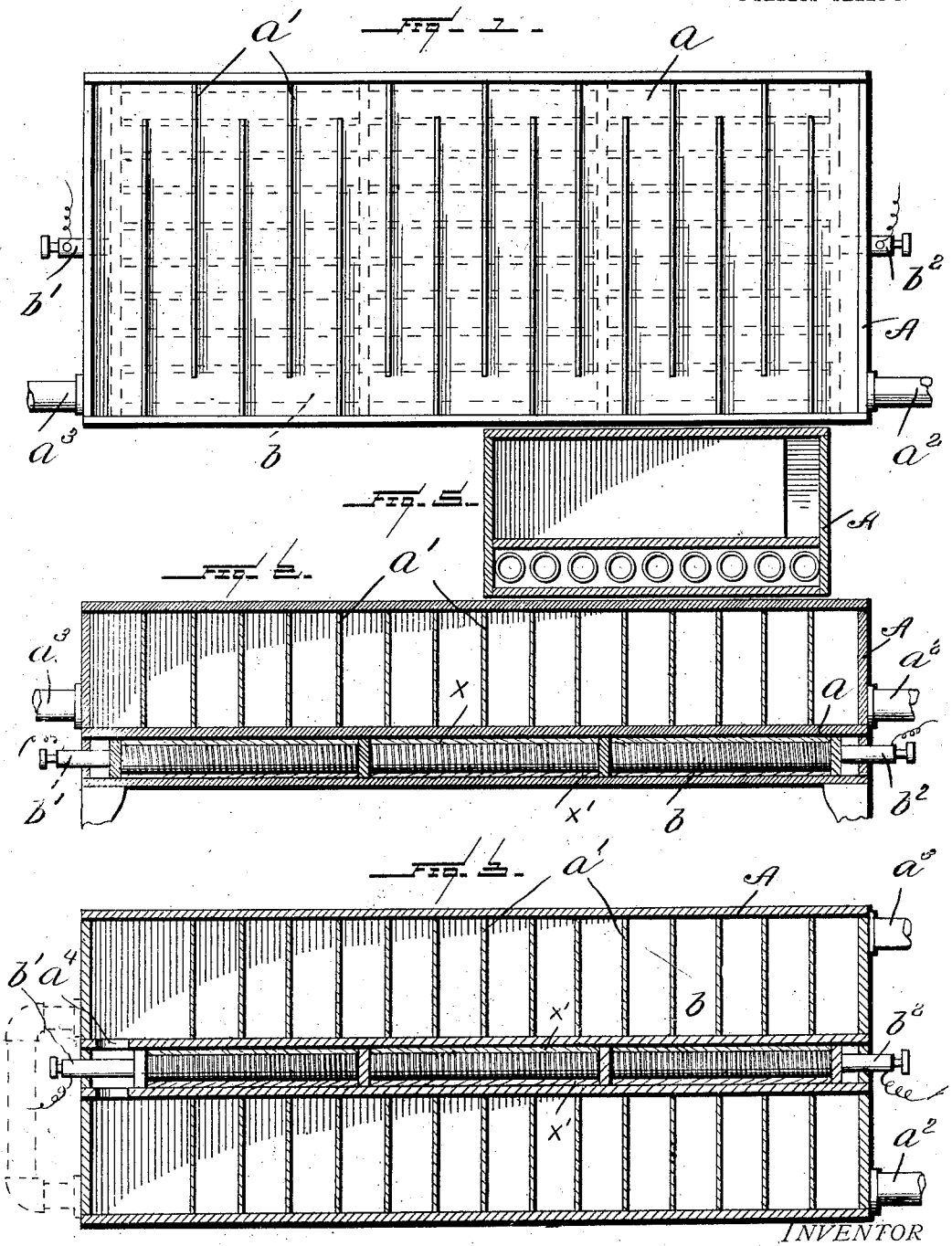

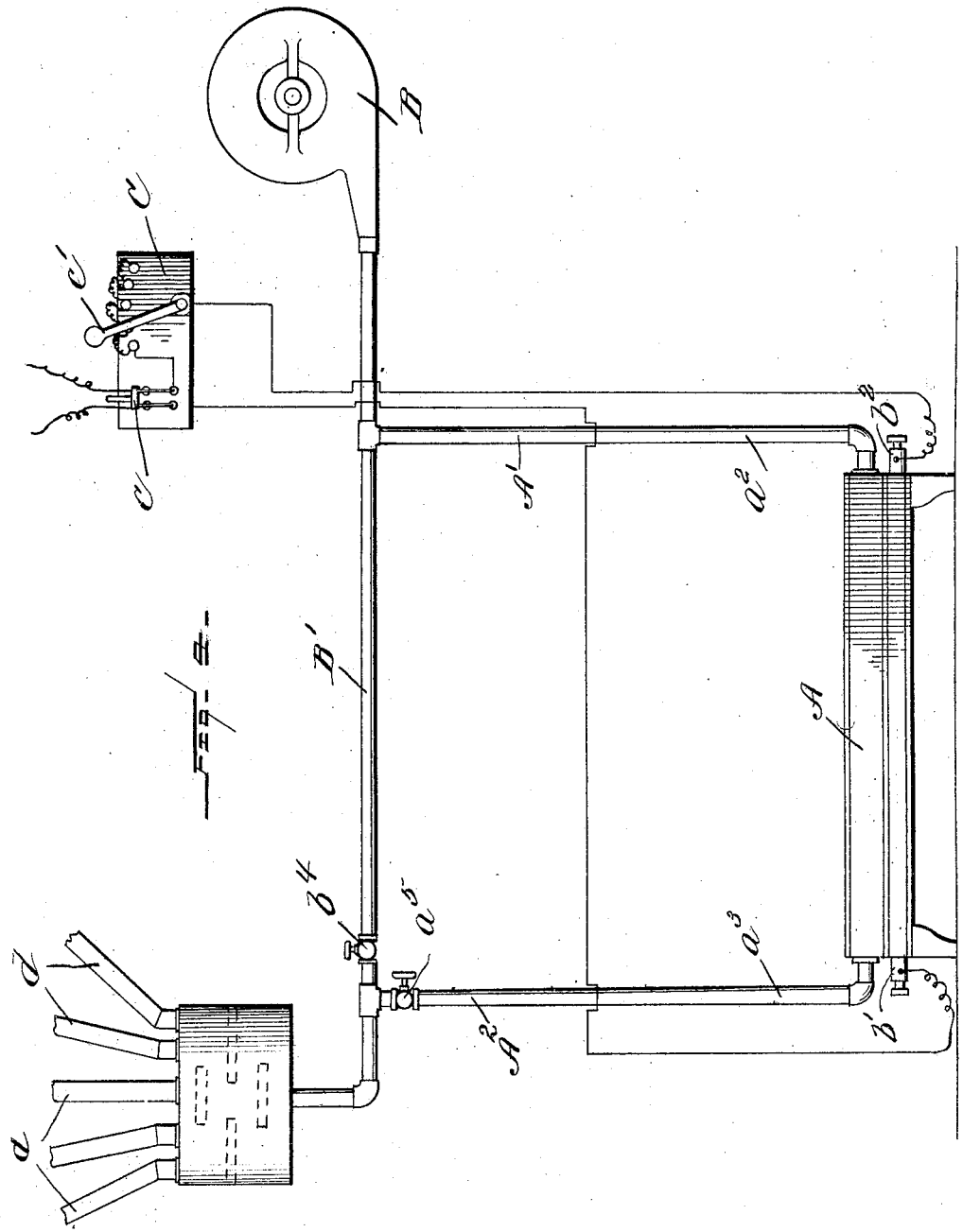

AXEL H. CARLSON, OF PHILADELPHIA, PENNSYLVANIA, ASSIGNOR OF ONE-HALF TO RICHARD GRAHAM, OF PHILADELPHIA, PENNSYLVANIA.

ELECTRIC HEATER.

No. 829,318.

Specification of Letters Patent.

Patented Aug. 21, 1906.

Application filed June 30, 1905. Serial No. 267,756.

*To all whom it may concern:*

Be it known that I, AXEL H. CARLSON, a citizen of the United States, residing at Philadelphia, in the county of Philadelphia and State of Pennsylvania, have invented certain new and useful Improvements in Electric Heaters; and I do hereby declare the following to be a full, clear, and exact description of the invention, such as will enable others skilled in the art to which it appertains to make and use the same.

My present invention is an improvement in electric heating devices for heating air.

It consists in certain new constructions and combinations of parts whereby a cheap and effective electric heater for air is produced.

In the accompanying drawings I have illustrated the best form in which I have contemplated embodying my said invention, and said invention is disclosed in the following description and claims.

In the drawings, Figure 1 is a plan view with top removed of my improved heater, showing the air-passages above the heating-coils. Fig. 2 is a longitudinal vertical section. Fig. 3 is a like view showing an air-heating compartment both above and below the heating-coils. Fig. 4 is a view of my heater with connections for heating a house or other building. Fig. 5 is a transverse vertical section of the devices shown in Figs. 1 and 2.

In the drawings, A is the outside or inclosing casing. In Figs. 1 and 2 a partition $a$ divides the interior of the casing A into two compartments. The lower compartment is quite shallow, and in it are placed the electric-heater coils $b$. These coils preferably extend longitudinally of the casing A. The upper and larger compartment of the casing is provided with plates $a'$, extending alternately from opposite sides of the casing, each plate extending to near the opposite side of the casing, forming a zigzag passage from one end of the heater-casing to the other. At one end is the air-inlet pipe or opening $a^2$, and at the other is the outlet $a^3$ for the heated air. $b'$ $b^2$ are the binding-posts to which the electric conductors for supplying electricity to the heating-coils are secured. An air-forcing device is connected with the air-inlet, as shown in Fig. 4.

The operation of the device will be readily understood. An electric current having been thrown into the heating-coils $b$, the air-forcing device connected with the air-inlet is put in operation, forcing air into and through the tortuous course formed by the plates $a'$ in the upper compartment of the heater. These plates being in contact or connected with the division-plate $a$ become highly heated, and the air passing through the heater is raised to a high degree of heat by them. The heated air is conducted by suitable piping to the place at which it is desired to utilize the same.

Such a number of heating-coils are employed as will secure the desired results. In the construction shown in Figs. 1 and 2 the plate or partition immediately above such coils is coated with an enamel which is a non-conductor of electricity, but a good conductor of heat. This coiling is shown at $x$, Fig. 2. The coils are made to lie in contact with such enameled surface, while a substance that is a non-conductor of heat is placed between the coils and the plate below them, (see $x'$, Fig. 2.)

In Fig. 3 I have shown a construction in which an air-heating chamber is provided above and below the heating-coils. Such heating-chambers are constructed with heating-plates $a'$ $a'$, as in the form of my device shown in Figs. 1 and 2. In this form the partition above and below the coils is coated with an electrical insulating-enamel just spoken of and the coils brought into contact with both. Of the two heating-compartments the lower is provided with the air-inlet $a^2$ and the upper with the air-outlet $a^3$, and the two are connected at the opposite end by the passage $a^4$, extending from one to the other, or by a pipe connection. (Shown in dotted lines.)

In Fig. 4 I have shown the simpler form of construction with connections indicated. In this view A is the casing of my heater. As shown in Figs. 1 and 2, A' is the pipe connecting it with the blower B. $A^2$ is the outlet-pipe, and B' a pipe connecting the inlet and outlet air-pipes. In this pipe is a cock $b^4$, by the manipulation of which the cooler air can be admitted to the outgoing volume of heated air to lower the temperature of the same when desired, and the pipe $A^2$ is provided with a cock or valve $a^5$, by which the flow of heated air through the pipe may be regulated.

C is the switchboard, upon which are the electrical controlling devices. These include the ordinary switch $c$ and a variable-resistance device $c'$.

If the heater should be made large enough to heat a plurality of rooms, the outgoing air-pipe A' may be made to connect with a number of pipes $d\ d\ d$, leading to the rooms to be heated. If the construction is quite large, I should prefer to place what I call a "mixer" between the pipe $A^2$ and the distributing-pipes $d\ d\ d$ in order that any cold air introduced by the pipe B' may be thoroughly commingled with the heated air and not be delivered to any one or two of the distributing-pipes. This mixer is merely a receptacle containing baffle-plates or horizontally-disposed partitions of wire-gauze or perforated metal or any other of the well-known constructions for breaking up and diffusing jets or currents of air after the manner indicated in dotted lines in the drawings.

The relative proportions of the different parts may be varied without departing from the spirit of my invention, and I therefore do not desire to be limited to the exact details of the construction shown and described.

What I claim, and desire to secure by Letters Patent, is—

1. The electric air-heating device comprising the air-heating chamber provided with the tortuous air-passage, defined by plates in contact with the walls of said chamber and heating-coils in conductive relation to one of the walls of said chamber, substantially as described.

2. The electric heating device comprising the air-heating chamber provided with an extended air-heating passage defined by plates in contact with the upper and lower walls of said chamber, heating-coils in conductive relation to the lower wall of said chamber and an air-forcing device connected with the inlet, substantially as described.

3. In an electric heater, the combination with the casing, of means dividing the casing into air-heating space and space for the heating-coils, plates within said air-heating space defining a tortuous passage for the air, electric coils for supplying heat to the air-heating space and said plates, and an air-inlet to the said air-heating space, substantially as described.

4. In an electric heater, the combination with the casing, of means dividing the casing into air-heating space and space for the heating-coils, plates within said heating-space forming a tortuous passage for the air, electric heating-coils in the space for the same for heating the air-heating space and the said plates, an air-inlet and an air-outlet, and an air-forcing device connected with said air-inlet, substantially as described.

5. In an electric heater, the combination with the electric heating-coils, of air-heating means consisting of a tortuous passage for said air in conductive relation to said coils, an air-inlet and an air-outlet, an air-forcing device connected with the air-inlet, means for distributing the air and a connection between the air-outlet of the heater and said distributing means, substantially as described.

6. In an electric heater, the combination with the heating-coils, of an air-heating passage in conductive relation with said heating-coils, an air-inlet and an air-outlet for said passage, an air-forcing device connected with said air-inlet, means for distributing the heated air, a pipe or other connection between said outlet and the air-distributing means, a direct connection between the air-forcing device and the pipe leading to the distributing means, said pipe or connection between the air-heater and distributing means including a mixer between the direct connection with the air-forcing device and the distributing means, substantially as described.

In testimony whereof I affix my signature in the presence of two witnesses.

A. H. CARLSON.

Witnesses:
 L. P. WHITAKER,
 F. H. HUBBARD.